(12) United States Patent  
Nomoto

(10) Patent No.: US 8,416,652 B2  
(45) Date of Patent: Apr. 9, 2013

(54) OPERATION DEVICE, VIDEO PLAYBACK DEVICE, AND OPERATION INFORMATION OUTPUT METHOD

(75) Inventor: Masashi Nomoto, Hyogo (JP)

(73) Assignee: Sony Corporation (JP)

( * ) Notice: Subject to any disclaimer, the term of this patent is extended or adjusted under 35 U.S.C. 154(b) by 959 days.

(21) Appl. No.: 12/455,109

(22) Filed: May 28, 2009

(65) Prior Publication Data

US 2009/0304349 A1    Dec. 10, 2009

(30) Foreign Application Priority Data

Jun. 5, 2008    (JP) ................................ P2008-147838

(51) Int. Cl.
*G11B 21/08*    (2006.01)
(52) U.S. Cl. .................. 369/30.17; 369/30.26; 386/344; 386/350; 386/352
(58) Field of Classification Search ............... 369/30.17, 369/30.26; 386/344.35, 352
See application file for complete search history.

(56) References Cited

U.S. PATENT DOCUMENTS

| | | | | |
|---|---|---|---|---|
| 6,332,159 | B1 * | 12/2001 | Hatae et al. ................... | 709/224 |
| 7,804,744 | B2 * | 9/2010 | Shuster ...................... | 369/13.35 |
| 8,174,605 | B2 * | 5/2012 | Yamada .................... | 348/333.02 |
| 2002/0176327 | A1 * | 11/2002 | Yamada et al. ............ | 369/30.26 |
| 2003/0160891 | A1 * | 8/2003 | Mikamo ....................... | 348/375 |
| 2006/0146659 | A1 * | 7/2006 | Yamada et al. ............. | 369/30.3 |
| 2007/0140674 | A1 * | 6/2007 | Nomura et al. ................. | 396/52 |
| 2009/0031807 | A1 * | 2/2009 | Sugibayashi .............. | 73/504.16 |
| 2011/0176404 | A1 * | 7/2011 | Shuster ......................... | 369/286 |
| 2012/0275284 | A1 * | 11/2012 | Shuster ........................ | 369/53.2 |

FOREIGN PATENT DOCUMENTS

| | | |
|---|---|---|
| JP | 04-048455 A | 2/1992 |
| JP | 08-051589 A | 2/1996 |
| JP | 11-146336 A | 5/1999 |
| JP | 03095785 B2 | 10/2000 |
| WO | 2007037274 A1 | 4/2007 |
| WO | 2007125632 A1 | 11/2007 |

OTHER PUBLICATIONS

Office Action from Japanese Application No. 2008-147838, dated Aug. 17, 2010.
Office Action from Japanese Application No. 2008-147838, dated Mar. 9, 2010.

* cited by examiner

*Primary Examiner* — Helen Shibru
(74) *Attorney, Agent, or Firm* — Lerner, David, Littenberg, Krumholz & Mentlik, LLP

(57) ABSTRACT

An operation device includes a rotational operation element, an angular velocity detection portion detecting an angular velocity of a rotational operation on the rotational operation element, and a playback speed information computation portion calculating, when the angular velocity detected by the angular velocity detection portion is in a first velocity range including an angular velocity of 0, playback speed information according to the detected angular velocity through a first functional computation and when the angular velocity detected by the angular velocity detection portion is in a second velocity range, which is a range higher than the first velocity range, playback speed information according to the detected angular velocity through a second functional computation, and outputting the calculated playback speed information.

6 Claims, 12 Drawing Sheets

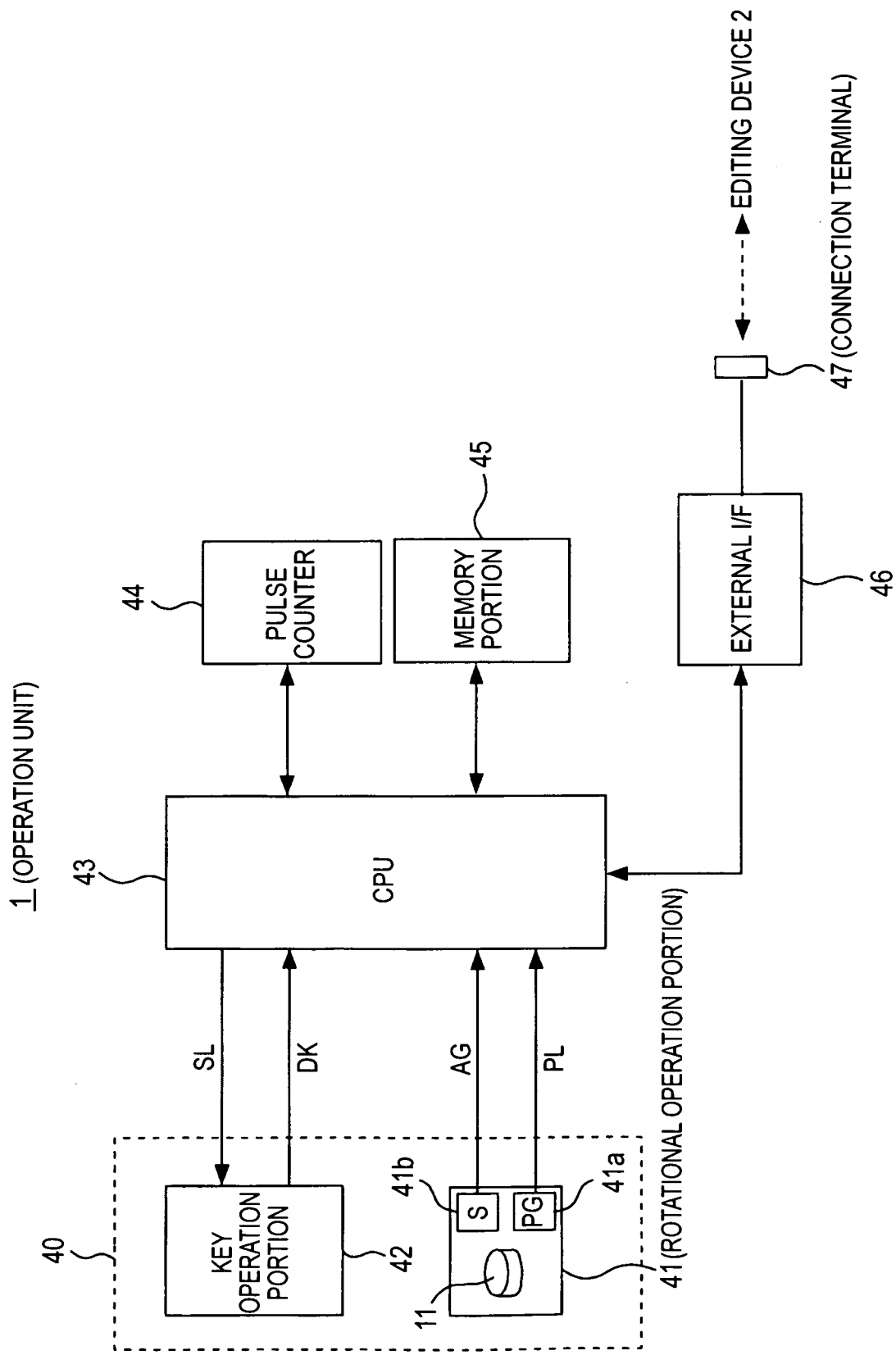

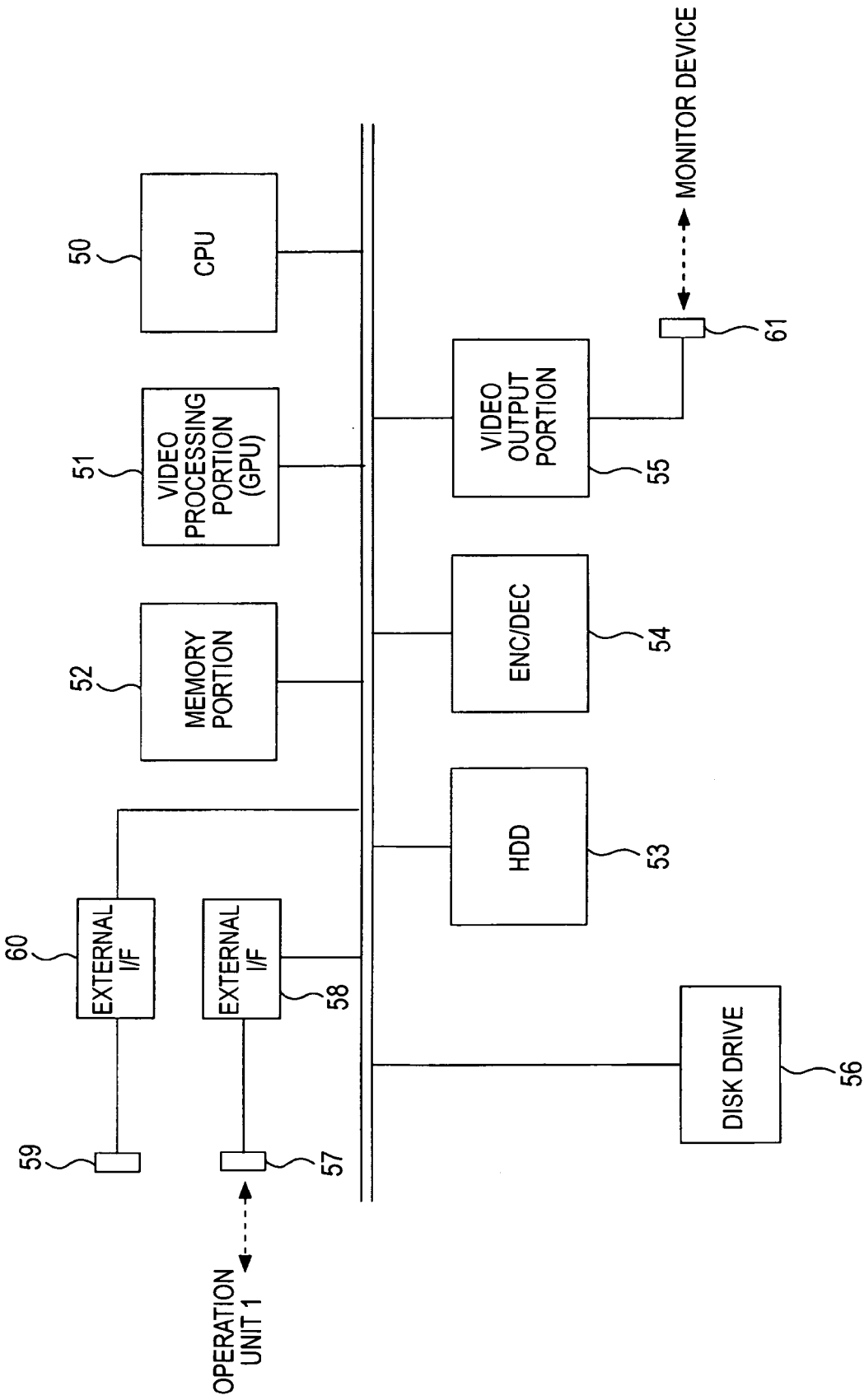

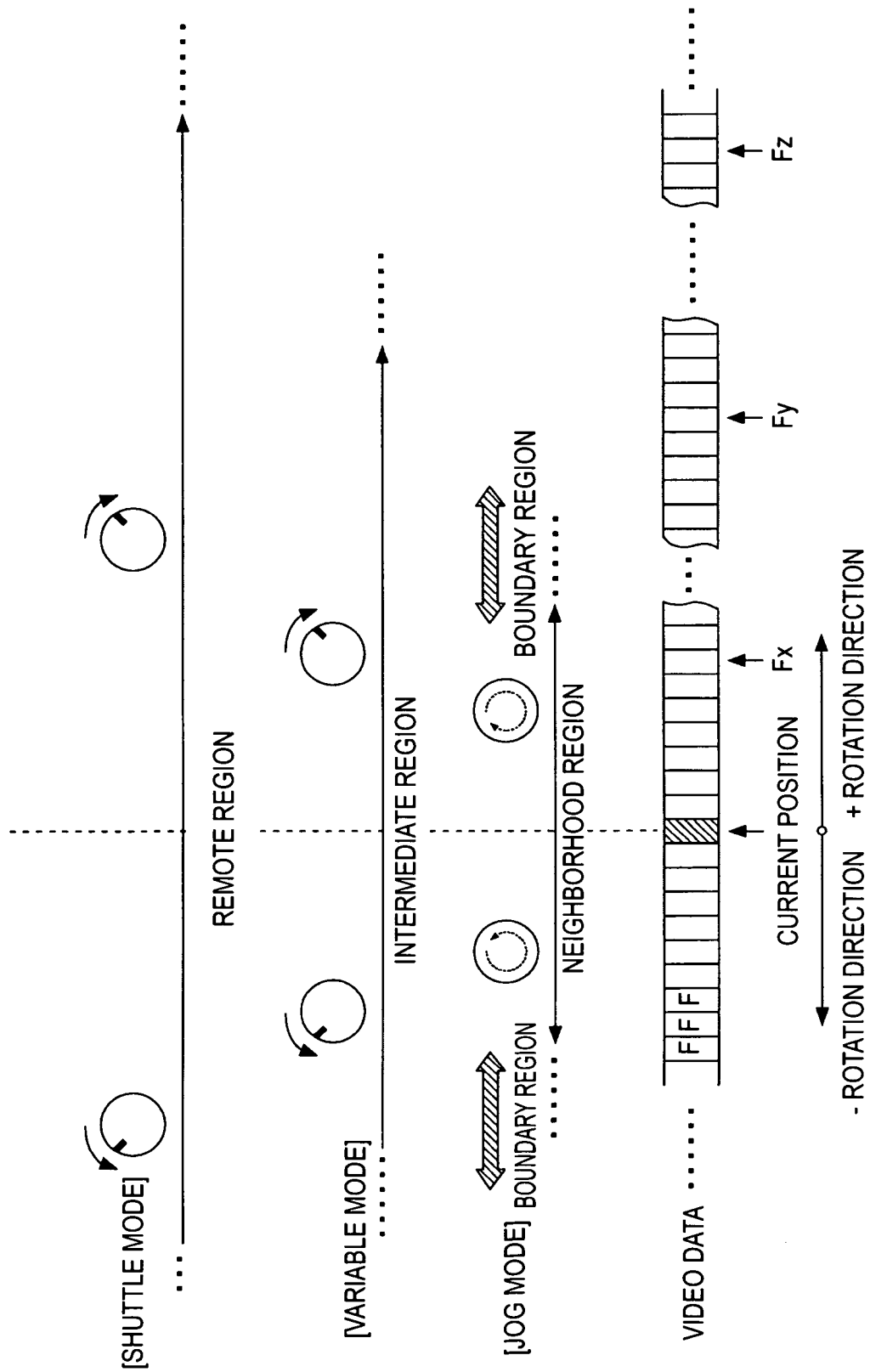

COMPARATIVE EXAMPLE
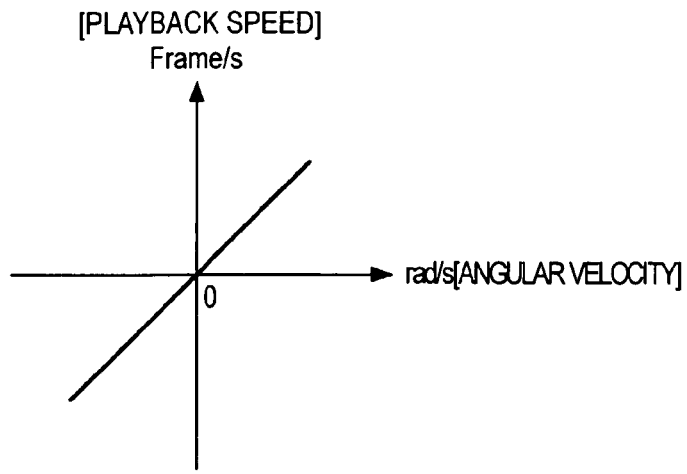
FIG.6A JOG MODE
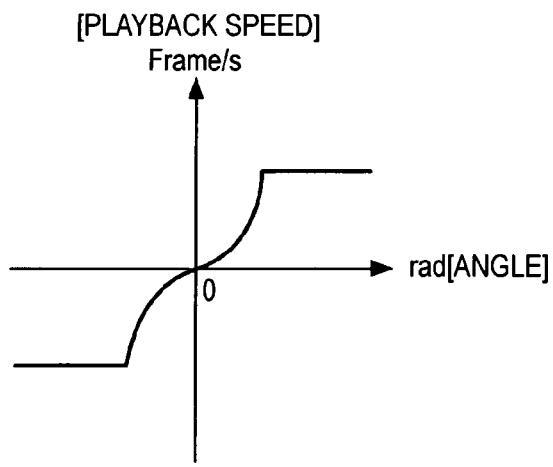
FIG.6B VARIABLE MODE
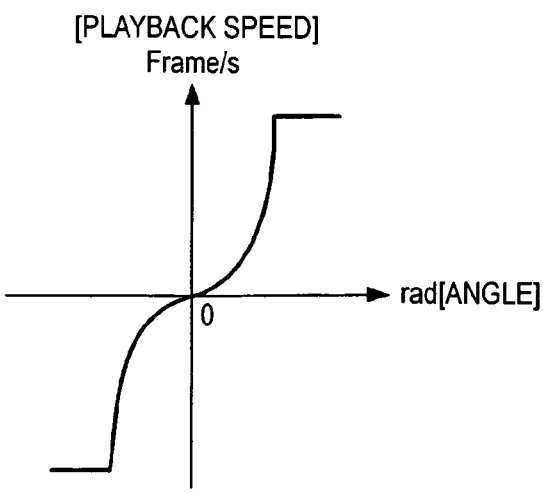
FIG.6C SHUTTLE MODE EMBODIMENT
FIG.7A JOG MODE
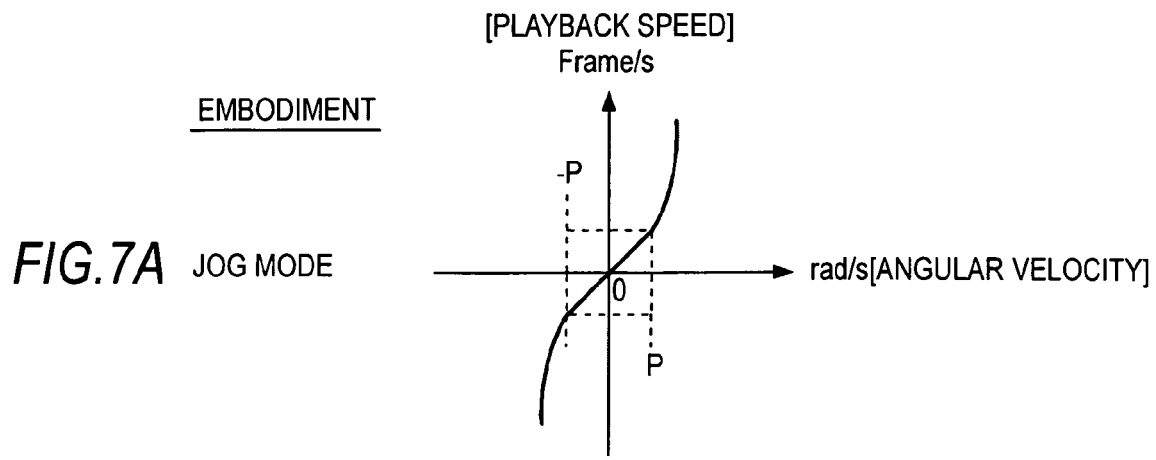
FIG.7B VARIABLE MODE
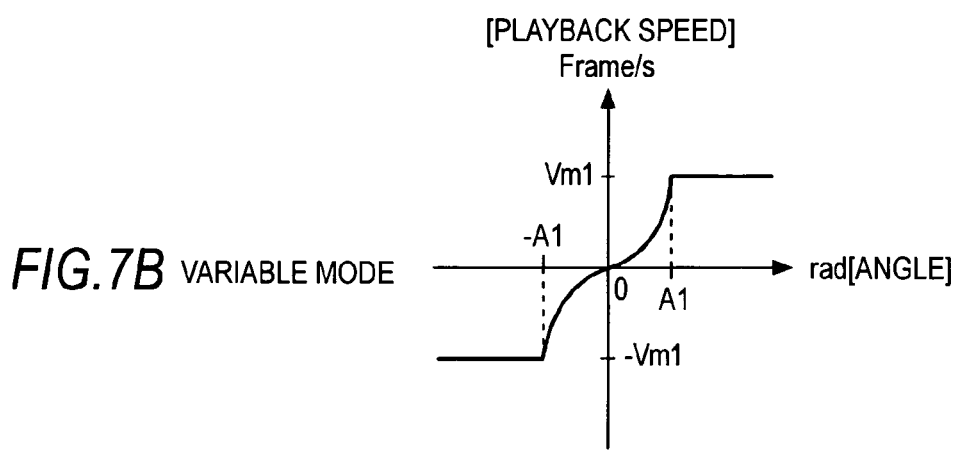
FIG.7C SHUTTLE MODE
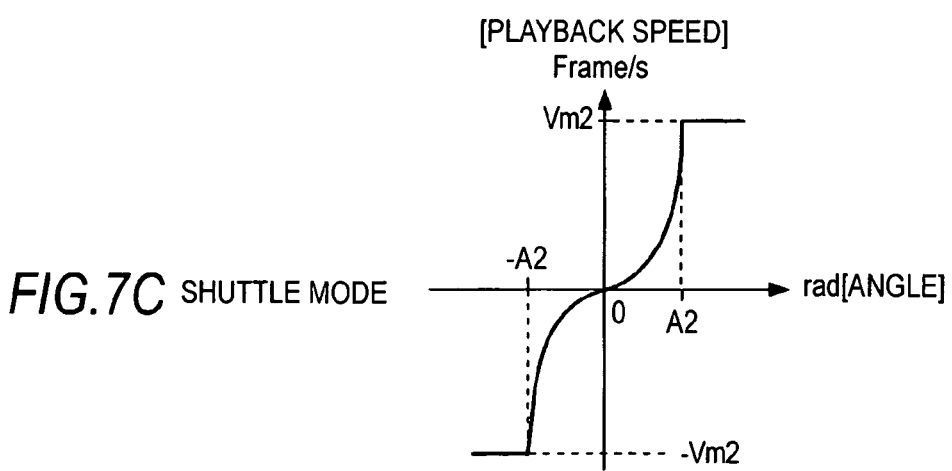

FIG.8A JOG MODE
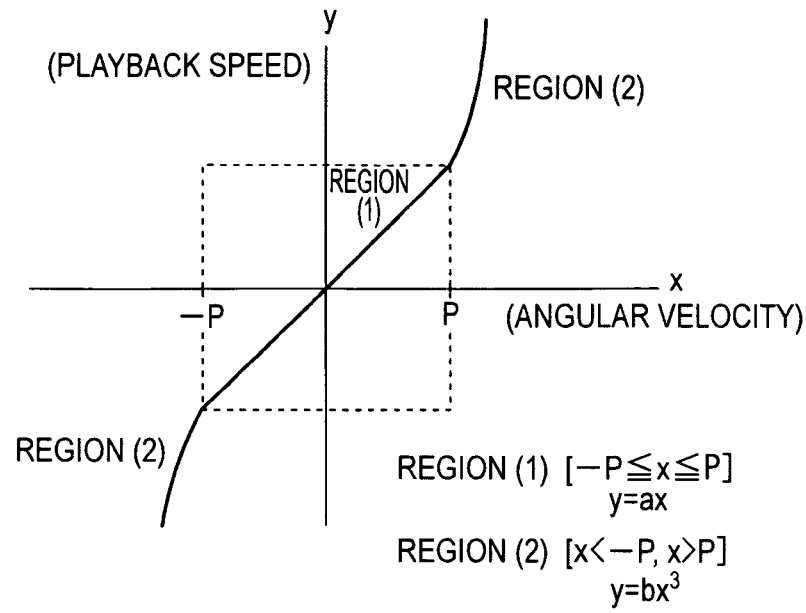
REGION (1) $[-P \leqq x \leqq P]$
$y = ax$
REGION (2) $[x < -P, x > P]$
$y = bx^3$
FIG.8B JOG MODE
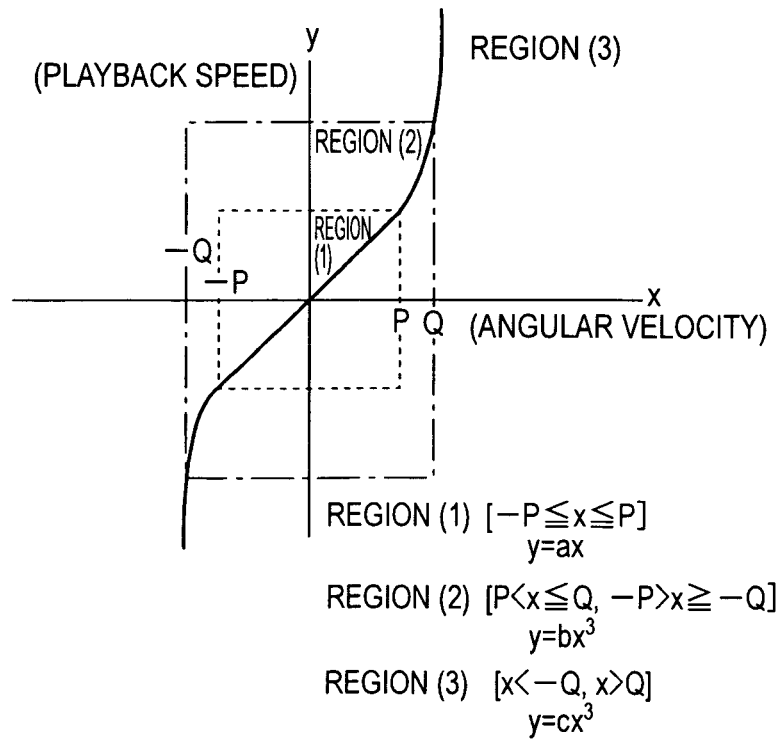
REGION (1) $[-P \leqq x \leqq P]$
$y = ax$
REGION (2) $[P < x \leqq Q, -P > x \geqq -Q]$
$y = bx^3$
REGION (3) $[x < -Q, x > Q]$
$y = cx^3$

OPERATION DEVICE, VIDEO PLAYBACK DEVICE, AND OPERATION INFORMATION OUTPUT METHOD The present application claims priority from Japanese Patent Application No. JP 2008-147838 filed in the Japanese Patent Office on Jun. 5, 2008, the entire content of which is incorporated herein by reference.

BACKGROUND OF THE INVENTION

1. Field of the Invention

The present invention relates to an operation device, a video playback device, and an operation information output method, and more particularly, to those suitable for a search operation during playback of videos.

2. Background Art

In the broadcasting service, a video content as a program is made by editing video materials. Recently, a case is increasing where the user edits materials in various manners and makes a video content using a video device for private use.

A video content is made by video editing, such as cut edit and insert edit, by which video materials are extracted and combined. In this instance, in order to determine edit points on a video, such as in points, out points, and insertion points, the operator performs an operation to search an arbitrary video point by playing back the video materials.

Accordingly, various techniques of facilitating a search operation with moving videos have been proposed for a video editing device and an editing system. For example, Japanese Patent No. 2831278 discloses a technique of enhancing the operability for fast-forwarding and rewinding using buttons assigned to a search operation.

Also, there is a video editing device provided with a rotational operation element, a so-called jog dial, to enable a more comfortable search operation. For example, Japanese Patent No. 2990744 discloses a technique relating to the setting of a search speed in response to rotational operations.

SUMMARY OF THE INVENTION

For example, video editing works in business are often finished in a short time because the program has to be ready in time for broadcast. The editing workability is therefore specifically necessary for a device used for editing.

Among the editing works, a relatively time consuming work is a search work to find an edit point. Even when the operator is actually able to perform a search operation comfortably using a jog dial, a suitable speed to play back the material forward or backward to a target point on a video is still difficult to understand. For example, varying a search speed and switching the search modes according to an operation angle of the jog dial haven been proposed. However, it is often that a target point (point on the video) is passed over or conversely it takes a time to reach the target point.

For example, the search mode includes a mode for a neighborhood1 search in which a search is conducted frame by frame or at a low speed and a mode for a remote search in which a search is conducted at a high speed. However, when a search is conducted frame by frame or at a low speed, it takes a time to reach the target point. On the contrary, when a search is conducted at a high speed, the target point is passed over. These events occur frequently in actual editing workplaces and lead to a delay in the editing works.

Thus, it is desirable to further facilitate a search operation for finding a target point on a video more promptly by the editing works.

An operation device according to an embodiment of the invention includes a rotational operation element, an angular velocity detection portion detecting an angular velocity of a rotational operation on the rotational operation element, and a playback speed information computation portion calculating, when the angular velocity detected by the angular velocity detection portion is in a first velocity range including an angular velocity of 0, playback speed information according to the detected angular velocity through a first functional computation and when the angular velocity detected by the angular velocity detection portion is in a second velocity range, which is a range higher than the first velocity range, playback speed information according to the detected angular velocity through a second functional computation, and outputting the calculated playback speed information.

The operation device further includes an angle detection portion detecting an angle of the rotational operation on the rotational operation element, and the playback speed information computation portion is able to calculate the playback speed information in an angular velocity mode and in an angle mode. In the angle mode, the playback speed information computation portion calculates and outputs the playback speed information according to the angle detected by the angle detection portion, and in the angular velocity mode, it calculates and outputs the playback speed information according to the detected angular velocity through the first functional computation when the angular velocity detected by the angular velocity detection portion is in the first velocity range including the angular velocity of 0, and the playback speed information according to the detected angular velocity through the second functional computation when the angular velocity detected by the angular velocity detection portion is in the second velocity range, which is a range higher than the first velocity range.

The playback speed information is playback speed information that specifies a playback speed of a video playback action.

The operation device further includes an external interface portion, and the playback speed information calculated in the playback speed information computation portion is supplied to an external video playback device via the external interface portion.

The first functional computation is a functional computation in which a relation between the angular velocity and the playback speed information is linear, and the second functional computation is a functional computation in which the relation between the angular velocity and the playback speed information is non-linear.

A video playback device according to another embodiment of the invention includes a rotational operation element, an angular velocity detection portion detecting an angular velocity of a rotational operation on the rotational operation element, a video playback processing portion performing playback processing on video data, and a playback speed information computation portion calculating, when the angular velocity detected by the angular velocity detection portion is in a first velocity range including an angular velocity of 0, playback speed information according to the detected angular velocity through a first functional computation and when the angular velocity detected by the angular velocity detection portion is in a second velocity range, which is a range higher than the first velocity range, playback speed information according to the detected angular velocity through a second functional computation, and outputting the calculated playback speed information as specifying information of a playback speed to the video playback processing portion.

An operation information output method according to still another embodiment includes the steps of detecting an angular velocity of a rotational operation on a rotational operation element, calculating and outputting, when the angular velocity detected in the angular velocity detecting step is in a first velocity range including an angular velocity of 0, playback speed information according to the detected angular velocity through a first functional computation, and calculating and outputting, when the angular velocity detected in the angular velocity detecting step is in a second velocity range, which is a range higher than the first velocity range, playback speed information according to the detected angular velocity through a second functional computation.

According to the embodiments of the invention, regarding operations on the rotational operation element (for example, a jog dial), in a case where playback speed information is generated according to an angular velocity of a rotational operation and outputted as video playback operation information, when the angular velocity is in the first velocity range, the playback speed information is generated through the first functional computation (linear functional computation) according to the current angular velocity, and when the angular velocity is in the second velocity range, the playback speed information is generated through the second functional computation (non-linear functional computation) according to the current angular velocity.

It thus becomes possible to accelerate a search speed to a larger extent by increasing, for example, the rotational operation speed.

According to the embodiments of the present invention, a comfortable search operation to a video point up to which the operator wishes to conduct a search is enabled with a degree of operations relating to the rotational operation speed (angular velocity) of the rotational operation element. It thus becomes possible to further shorten the time consumed on the video editing works.

Also, in a case where it is configured in such a manner that the mode is switched, for example, to the angular velocity mode for a neighborhood search and to the angle mode for a remote search, even when a target point on a video is at a position where it is often passed over in the angle mode but it takes a time when a search is conducted slowly, that is, at an intermediate position that is neither in neighborhood nor in the distance, a comfortable search is enabled according to the playback operation information generated through the second functional computation in the angular velocity mode.

BRIEF DESCRIPTION OF THE DRAWINGS

FIG. 3 is a block diagram showing the configuration of the operation unit of the first embodiment;

FIG. 4 is a block diagram showing the configuration of an editing device of the first embodiment;

FIG. 5 is a view used to describe a search mode in one embodiment;

FIG. 6A through FIG. 6C are views used to describe a playback speed calculation method in respective search modes as a comparative example;

FIG. 7A through FIG. 7C are views used to describe the playback speed calculation method in the respective search modes in the first embodiment;

FIG. 8A and FIG. 8B are views used to describe the playback speed calculation method in a jog mode in the first and second embodiments, respectively;

DETAILED DESCRIPTION OF EMBODIMENTS

Hereinafter, embodiments of the invention will be described. First and second embodiments will describe an operation unit used when connected to a video editing device as an operation device according to embodiments of the present invention by way of example. Also, a third embodiment will describe a video editing device according to a video playback device according to an embodiment of the present invention by way of example.

First Embodiment

Figure 1:
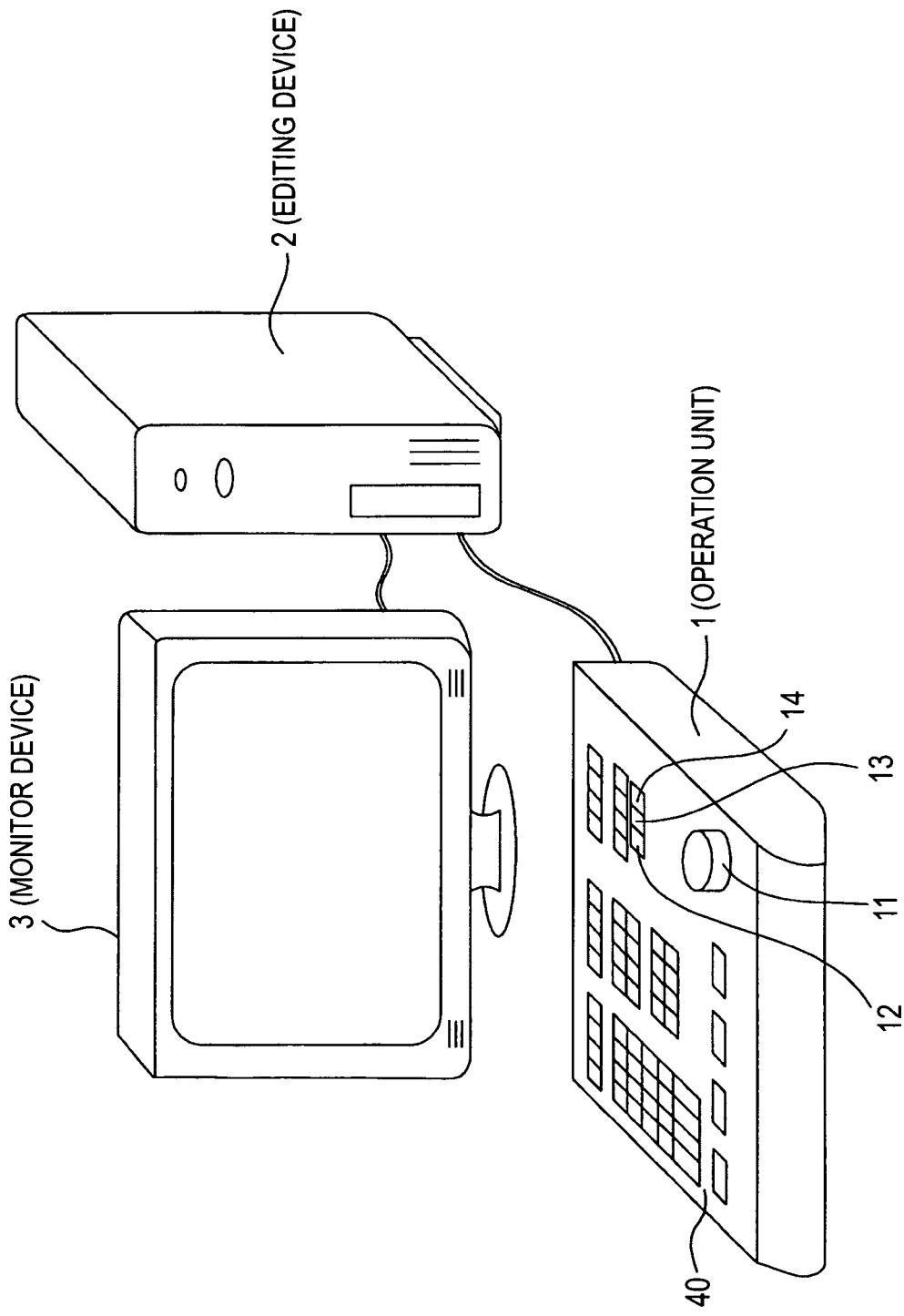
FIG. 1 is a view used to describe an editing system according to a first embodiment of the invention.

FIG. 1 shows an example of a video editing system. The video editing system includes an operation unit 1, an editing device 2, and a monitor device 3.

The editing device 2 is a device that plays back various types of video materials and performs editing processing, and a playback video is displayed on the monitor device 3. The editing device 2 may be a so-called specialized device or a general device, such as a personal computer, configured to function as an editing device by running a software program.

The operation unit 1 is an operation device that the user uses for operations involved with editing works using the editing device 2.

Figure 2:
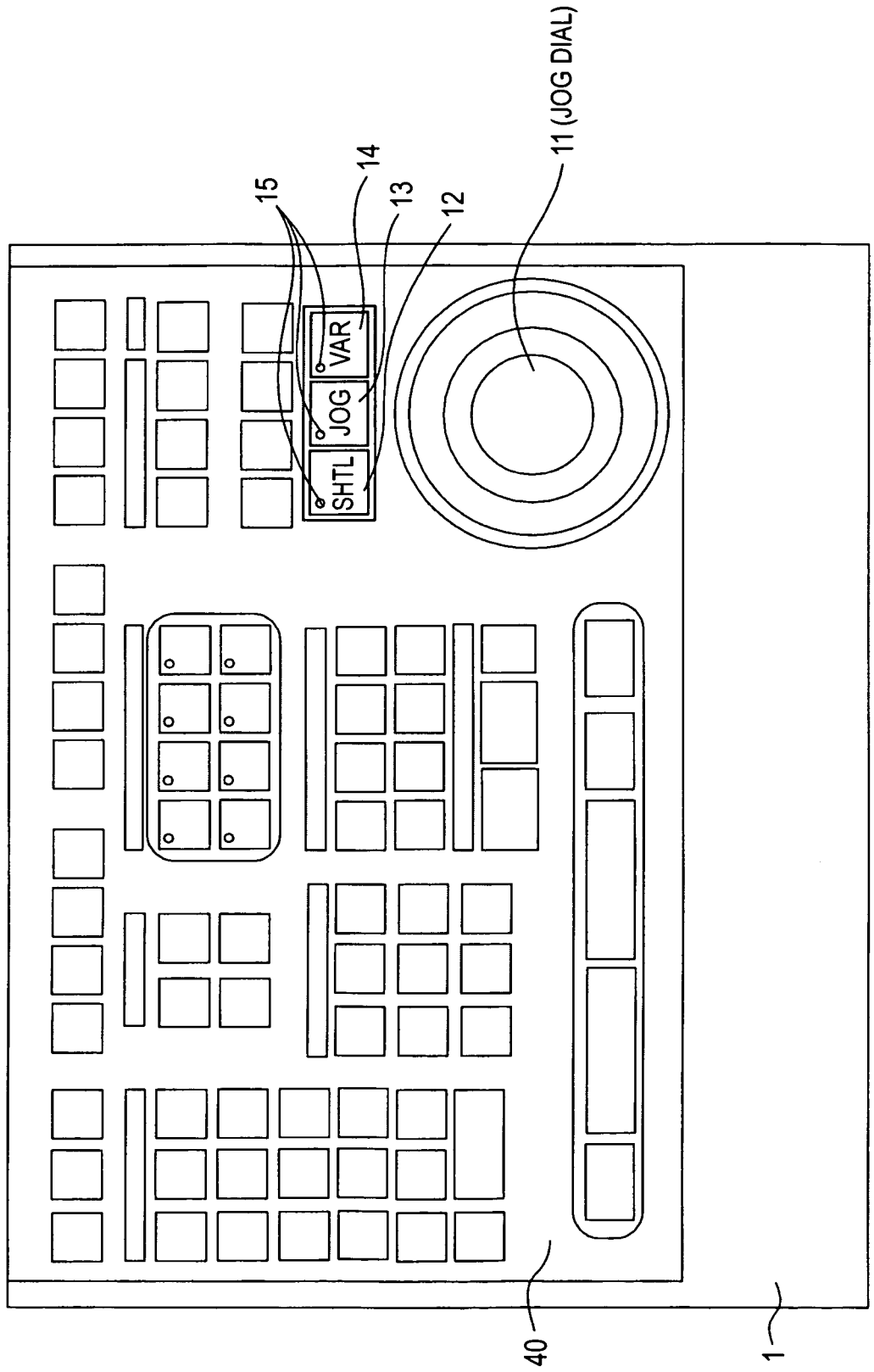
FIG. 2 is a plan view of an operation panel of an operation unit of the first embodiment.

As is shown in FIG. 2, operation elements, such as a various types of operation keys, are disposed on an operation panel portion 40 of the operation unit 1. Although detailed descriptions of the respective operation elements are omitted herein, a jog dial 11 and search mode keys 12, 13, and 14 are provided as operation elements relating to characteristic actions of this embodiment described below.

The jog dial 11 is an operation element that the user is allowed to operate rotationally without any restriction in both directions (right rotation and left rotation). The operation unit 1 generates playback speed information according to a rotational operation on the jog dial 11 and supplies the playback speed information to the editing device 2. The user is able to specify a search action while a video is being played back in the editing device 2 through rotational operations on the jog dial 11.

Although it will be described below, three modes, namely a job mode, a variable mode, and a shuttle mode, are prepared in this embodiment as the modes of search action.

The search mode key 12 is an operation key that specifies the shuttle mode (hereinafter, referred to as the shuttle mode key 12). The search mode key 13 is an operation key that specifies the jog mode (hereinafter, referred to as the job mode key 13). The search mode key 14 is an operation key that specifies the variable mode (hereinafter, referred to as the variable mode key 14).

These three modes of search action are different in a generation method of the playback speed information supplied to the editing device 2 according to the rotational operations on the jog dial 11. The user therefore selects the mode according to the aim of a search and performs rotational operations on the jog dial 11.

Each of the shuttle mode key 12, the jog mode key 13, and the search mode key 14 is provided with an LED (Light Emitting Diode) serving as a luminous portion 15 so that the current mode is indicated to the user. For example, after the user operates the shuttle mode key 12, the luminous portion 15 of the shuttle mode key 12 shifts to a luminous state, which makes it possible to indicate that the shuttle mode is currently set.

FIG. 3 shows an example of the internal configuration of the operation unit 1.

The operation unit 1 includes an operation panel portion 40, a CPU (Central Processing Unit) 43, a pulse counter 44, a memory portion 45, and an external interface 46.

The operation panel portion 40 includes a key operation portion 42 having various operation keys as is shown in FIG. 2 and a rotational operation portion 41 having the jog dial 11.

The key operation portion 42 detects a pressing on each operation key and supplies key operation information DK according to an operation on each operation key to the CPU 43. The CPU 43 detects an operation input content relating to the operation key on the basis of the key operation information DK.

Also, a part of the operation keys, for example, the shuttle mode key 12, are provided with the luminous portions 15 correspondingly to the key, and the CPU 43 performs luminous control on the luminous portions 15 depending on an action condition using a luminous control signal SL.

The rotational operation portion 41 is provided with a pulse generation portion 41*a* and an angle sensor 41*b* in order to detect an operation on the jog dial 11.

The pulse generation portion 41*a* generates a pulse, for example, in response to rotations of the jog dial 11. For example, it is a pulse generator that generates n pulses per rotation. Also, the pulse generation portion 41*a* generates a pulse according to a right rotation and a left rotation of the jog dial 11. For example, in the case of a right rotation, it generates a positive pulse and a negative pulse in the case of a left rotation. A pulse PL outputted from the pulse generation portion 41*a* is supplied to the CPU 43.

The angle sensor 41*b* detects a rotation angle of the jog dial 11 and outputs angle information AG to the CPU 43. Regarding the rotation angle, given that the rotation initial position of the jog dial 11 is 0°, then angle information in a plus (+) direction is outputted in response to a right rotation operation and angle information in a minus (−) direction is outputted in response to a left rotation operation.

The CPU 43 generates various types of operation information in response to operations by the user using the operation panel portion 40.

The memory portion 45 comprehensively represents memory regions, such as a ROM, a RAM, and a non-volatile memory. An action program of the CPU 43 and information about operation command contents are stored in a ROM region of the memory portion 45. Setting information set by the user relating to operations and various processing coefficients are stored in a non-volatile memory region. A RAM region is used as a work region of the CPU 43.

The CPU 43, upon detection of which operation key is pressed on the basis of the key operation information DK from the key operation portion 42, reads out the operation command content according to the detected operation key from the memory portion 45 and generates an operation command in a predetermined transmission format, which is outputted to the external interface 46 and then transmitted to the editing device 2.

In a case where the CPU 43 detects the operations on the shuttle mode key 12, the jog mode key 13, and the search mode key 14, it is not particularly necessary to output an operation command to the editing device 2 and it performs the mode setting to switch the processing internally. In addition, in the case of detection of these mode operations, the CPU 43 performs the luminous control on the luminous portion 15 of the pressed key in order to indicate the current mode.

Upon detection of the pulse PL and the angle information AG in association with operations on the jog dial 11, the CPU 43 generates command information in response to the operations in the form of an operation command as playback speed information, which is outputted to the external interface 46 and then transmitted to the editing device 2.

Although it will be described below, in the case of the jog mode, the playback speed information is generated according to the angular velocity of a rotational operation on the jog dial 11. In this case, the CPU 43 supplies the pulse PL from the pulse generation portion 41*a* to the pulse counter 44 so that the number of pulses per unit time is counted therein. The number of pulses per unit time is, in other words, the information about the angular velocity relating to the rotational operation at that point in time. The CPU 43 then performs processing to generate the playback speed information through a predetermined functional computation according to the angular velocity detected in the pulse counter 44 and to transmit the playback speed information to the editing device 2 as an operation command specifying the speed of a search action.

In the case of the variable mode and the shuttle mode, the CPU 43 generates the playback speed information according to the angle of the rotational operation on the jog dial 11. In this case, the CPU 43 performs processing to generate playback speed information through a predetermined functional computation according to the angle information from the angle sensor 41*b* and to transmit the playback speed information to the editing device 2 as an operation command specifying a speed of a search action.

The example of the configuration in FIG. 3 shows a case where the rotational operation portion 41 is provided with the pulse generation portion 41*a* and the angle sensor 41*b*. It is, however, possible to omit the angle sensor 41*b*. By forming the pulse generation portion 41*a* so as to generate a pulse for every predetermined rotation angle, the CPU 43 becomes able to constantly detect a current angle state by setting the initial state to an angle of 0 and incrementing and decrementing the pulse count value for each positive pulse and negative pulse thereafter (for example, by controlling the pulse counter 44 to make a count). In this case, the angle sensor 41*b* may no longer be necessary.

The external interface 46 makes communications with external devices by a communication scheme of a predetermined standard, for example, a USB (Universal Serial Bus) Standard. In this case, the external interface 46 is connected to the editing device 2 via a cable using a connection terminal 47 and performs transmission processing on an operation command to the editing device 2.

It goes without saying that the communication scheme is not limited to the USB scheme and other inter-device communication schemes of general standards, such as IEEE1394, may be used as well. Alternatively, the operation unit 1 and the editing device 2 may make communications using an exclusive-use interface scheme. Further, an operation command may be transmitted to the editing device 2 not through a wireline connection but through wireless communications using a radio wave or an infrared signal.

An example of the configuration of the editing device 2 will now be described with reference to FIG. 4.

The editing device 2 includes a CPU 50, a video processing portion 51, a memory portion 52, an HDD (Hard Disk Drive) 53, an encoder and decoder 54, a video output portion 55, a disk drive 56, and external interfaces 58 and 60. It should be appreciated that the example of the configuration in FIG. 4 shows only portions involved with descriptions of actions in this embodiment for ease of description and it is anticipated that other component portions are present within the editing device 2 in practice.

The external interfaces 58 and 60 are formed as a USB interface or an interface of another communication scheme and make communications with external devices. For example, the external interface 58 performs communication processing with the operation unit 1 as a connection terminal 57 is connected to the connection terminal 47 of FIG. 3 via a USB cable. In this embodiment, an operation command from the operation unit 1 is subjected to reception processing at the external interface 58, after which it is supplied to the CPU 50.

The CPU 50 functions as a controller that performs overall action control. For example, it controls communications with the operation unit 1 and performs action control on the HDD 53 and the disk drive 56 and action control on the respective portions involved with editing actions.

The video processing portion 51 is a so-called GPU (Graphics Processing Unit) and performs various types of video processing. For example, it performs playback and output processing and editing processing on video data read out from the HDD 53.

The memory portion 45 comprehensively represents memory regions, such as a ROM, a RAM, and a non-volatile memory. There is a case where action programs of the CPU 50 and the video processing portion 51 are stored in a ROM region of the memory portion 45. Setting information about editing processing and various processing coefficients are stored in a non-volatile memory region. A RAM region is used as a work region of the video processing portion 51 and as a buffer region for edit videos and playback video data, or to read in a program stored in the HDD 53.

The HDD 53 is used to store various video materials and video contents as the result of editing, and further to install an action program and to record communication data and various files.

The disk drive 56 performs recording and playback of a portable recording medium, for example, a Blu-ray disc.

Video materials recorded in a portable recording medium can be played back by the disk drive 56 and captured in the HDD 53.

Also, in a case where a device, such as a video camera and a video player, is connected to the connection terminal 59, it is possible to receive video data transferred from the video camera or the like at the external interface 60 and store the video data in the HDD 53 as video materials.

The encoder and decoder 54 performs encode processing and decode processing on video data as the necessity arises, for example, from recording and playback actions of the HDD 53.

The video output portion 55 performs processing to output video data processed in the video processing portion 51, for example, video data played back during the editing works, to the monitor device 3. A video signal processed in the video output portion 55 is supplied to the monitor device 3 connected via a cable by the connection terminal 61 and outputted to be displayed thereon.

For example, the editing device 2 configured as above not only plays back video materials stored in the HDD 53 but also performs various types of edit processing and playback actions according to operation commands from the operation unit 1 during the editing works.

For example, when video data as a given video material is to be played back from the HDD 53, the video data (for example, compressed video data) read out from the HDD 53 is subjected to predetermined decoding processing in the encoder and decoder 54 while it is buffered in the memory portion 52. The video data after the decoding processing is supplied to the video processing portion 51 and processing for playback and display is applied thereon. The video data processed in the video processing portion 51 is supplied from the video output portion 55 to the monitor device 3 and displayed thereon.

Besides normal playback processing, the video processing portion 51 performs processing for fast-forwarding playback and fast-rewinding playback as so-called searches, processing relating to the setting of edit points, such as in points and out points, and further playback processing on a video edited by the setting of the edit points.

Upon receipt of playback speed information as an operation command in response to rotational operations on the jog dial 11 from the operation unit 1, the CPU 50 directs the video processing portion 51 to start playback at the specified playback speed. The video processing portion 51 then performs processing to play back video data read out from the HDD 53 at the specified speed. For example, it performs frame synthesis processing to reduce moving video frames according to a multiple speed of playback (for example, processing to synthesize a plurality of adjacent frames into one frame for reducing the number of frames per unit time) and processing for intermittent frame playback. The CPU 50 thus enables search playback at a speed according to rotational operations on the jog dial 11 in the operation unit 1.

Actions involved with a search operation during moving image playback of this embodiment in the editing system including, for example, the operation unit 1, the editing device 2, and the monitor device 3 as described above, in particular, processing by the operation unit 1 in response to operations on the jog dial 11 will now be described.

As has been described, the user is able to select the jog mode, the variable mode, and the shuttle mode as the search mode in this embodiment.

Firstly, a search operation using these search modes will be described with reference to FIG. 5.

In any mode, a right rotation is for a search operation in a forward direction and a left rotation is for a search operation in a backward direction.

The respective modes are appropriately used according to a distance from the current position (a current frame of the video being played back) to a target frame of the search.

The bottom row in FIG. 5 represents video data being played back. Each block labeled with a capital F represents one frame.

The diagonally shaped frame is the current position.

The jog mode is a mode suitable for a search in the neighborhood region before and after the current position. The jog mode is a mode in which search playback is specified at a playback speed according to a speed (that is, angular velocity) of rotational operations on the jog dial 11. For example, when the user wishes to find a frame Fx in the drawing, he only has to perform rotational operations on the jog dial 11 as the jog mode.

Largely speaking, in the case of the jog mode, the playback speed is low when the user rotates the jog dial 11 slowly and the playback speed becomes higher as he rotates the jog dial 11 faster. When the user stops rotating the jog dial 11, the angular velocity drops to 0. This specifies the playback speed of 0 and a video that has been played back is suspended.

Accordingly, in the case of a search in the neighborhood region, for example, for a frame Fx, the user is able to reach the target video point easily by moving a video point being played back forward or backward, for example, frame by frame, while adjusting the rotation speed of the jog dial 11.

It should be appreciated, however, that a playback video is kept moved forward or backward while the user is rotating the jog dial 11. Hence, in the case of a search to a remote video point, the jog mode is not suitable because the user has to keep rotating the jog dial 11.

In contrast, the shuttle mode is a mode suitable for a search in a remote region distant from the current position. The shuttle mode is a mode in which a playback speed is specified according to an angle of rotational operations on the jog dial 11. That is, an operation command specifying a higher playback speed is transmitted to the editing device 2 as the rotational angle becomes larger and a playback speed is increased.

Hence, in the case of the shuttle mode, the user specifies a playback speed by rotating the jog dial 11 by a given rotation angle. For example, when the user wishes to move the video forward (or backward) to a fairly remote video point, for example, a frame Fz in the drawing, he only has to rotate the jog dial 11 by a sufficiently large angle and stops the jog dial 11 at the rotated position.

Because playback speed information is transmitted to the editing device 2 according to the angler position of the jog dial 11, once the user has rotated the jog dial 11 by a sufficiently large angle, he is able to continue a search action at a playback speed according to the current angle without having to perform any particular processing. When the user wishes to stop a search, he only has to return the jog dial 11 to the initial position (the position at the angle of 0).

The variable mode is a mode suitable for a search in an intermediate range (intermediate region) between the neighborhood region and the remote region. As with the shuttle mode, the variable mode is a mode in which a playback speed is specified according to an angle of rotational operations on the jog dial 11. That is, an operation command specifying a higher playback speed is transmitted to the editing device 2 as the rotational angle becomes larger and a playback speed is increased. It should be noted, however, that the speed is limited in comparison with the shuttle mode and remarkably fast playback is not achieved. The variable mode is therefore suitable for a search for a target in the intermediate region, for example, a frame Fy in the drawing.

In this case, too, because playback speed information is transmitted to the editing device 2 according to the angle position of the jog dial 11, once the user has rotated the jog dial 11 by a sufficiently large angle, he is able to continue a search action at a playback speed according to the current angle without having to perform any particular processing. When the user wishes to stop a search, he only has to return the jog dial 11 to the initial position (the position at the angle of 0).

Herein, prior to the description of the processing of this embodiment, a relation assumed in the process of the development of the present invention will be described as a relation between rotation operations on the jog dial 11 and the specified playback speed information in each mode.

FIG. 6A through FIG. 6C show a relation between the rotational operations and the playback speed information as operation commands in the respective modes that were designed in the process to achieve the present invention as a comparative example of this embodiment.

FIG. 6A shows a case of the jog mode. The ordinate is used for a playback speed (Frame/sec) specified as an operation command and the abscissa is used for an angular velocity (rad/sec) of rotational operations on the jog dial 11. The relation between the angular velocity and the playback speed is a linear relation expressed by a linear function. Accordingly, a search speed is increased as the user rotates the jog dial 11 faster.

FIG. 6B shows a case of the variable mode. In this case, the abscissa is used for a rotation angle (rad) of the jog dial 11 with respect to the playback speed on the ordinate. The relation between the angle and the playback speed is a non-linear relation expressed by a cubic function. Accordingly, a search speed is increased as the user rotates the jog dial 11 by a deeper angle. Moreover, a rate of increase of the search speed becomes higher.

FIG. 6C shows a case of the shuttle mode. In this case, too, the abscissa is used for a rotation angle (rad) of the jog dial 11 with respect to the playback speed on the ordinate. The relation between the angle and the playback speed is a non-linear relation expressed by a cubic function. Accordingly, a search speed is increased as the user rotates the jog dial 11 by a deeper angle. Moreover, a rate of increase of the search speed becomes higher.

It should be noted that a maximum search speed is set higher in the shuttle mode than in the variable mode.

In a case where three modes are used appropriately according to a search distance as has been described with reference to FIG. 5, the setting processing of playback speed information in each mode is assumed as shown in FIG. 6A through FIG. 6C.

It is expected to enhance the search operability according to a distance to the target point by appropriately using the three modes.

However, even when the three modes were used appropriately as above, there was a case where the search operability was not optimal. This phenomenon was observed in the search operability in boundary regions of a search distance assumed in each of the angular velocity mode (that is, the jog mode) and the angle mode (the variable mode and the shuttle mode). In the case of FIG. 5, the boundary regions are regions indicated by a diagonally shaded arrow. That is, they are regions around the boundary between the neighborhood region where the jog mode is effective and the intermediate region where the variable mode is effective.

In each boundary region, a search in the jog mode increases a volume of rotational operations and the user feels tedious whereas a search in the variable mode has a possibility that a search goes beyond too far. Hence, this is a region where the user is not sure as to in which mode a search is to be conducted.

Such being the case, this embodiment enhances the operability also for a search in the boundary regions by improving actions in the jog mode.

FIG. 7A through FIG. 7C show a relation between rotational operations and playback speed information as an operation command in the respective modes of this embodiment.

FIG. 7B and FIG. 7C show cases of the variable mode and the shuttle mode, respectively, and the fundamental ideas of the relations in these cases are the same as those in FIG. 6B and FIG. 6C, respectively.

In the case of the variable mode in FIG. 7B, the playback speed information is set on the basis of a non-linear relation expressed by a cubic function according to the rotation angle of the jog dial 11. Here, let Vm1 (−Vm1 in the case of a backward direction) be the maximum search speed.

More specifically, in a case where the angle range is $-A1$ to $A1$, let y be the playback speed and x be the angle, then playback speed information y according to the angle is generated through a cubic functional computation: $y=dx^3$, where d is a coefficient.

In a case where an angle is larger than $A1$ (or $-A1$), the playback speed is fixed to $y=Vm1$.

Accordingly, the user is able to specify a search speed on the basis of the non-linear relation according to the angle in a range up to the maximum playback speed $Vm1$.

In the case of the shuttle mode in FIG. 7C, too, the playback speed information is set on the basis of a non-linear relation expressed by a cubic function according to the rotation angle of the jog dial 11. It should be appreciated, however, let $Vm2$ ($-Vm2$ in the case of a backward direction) be the maximum search speed herein.

More specifically, in a case where the angle range is $-A2$ to $A2$, let y be the playback speed and x be the angle, then playback speed information y according to the angle is generated through a cubic functional computation: $y=dx^3$, where e is a coefficient. It is preferable that the coefficient e is equal to the value of the coefficient d in the variable mode or larger than d.

In a case where the angle is larger than $A2$ (or $-A2$), the playback speed is fixed to $y=Vm2$.

Consequently, the user is able to specify a search speed on the basis of the non-linear relation according to the angle in a range up to the maximum playback speed $Vm2$. In particular, by setting the maximum playback speed higher than that in the variable mode, a search is suitable for a search in the remote region.

Meanwhile, in the case of the jog mode, as is shown in FIG. 7A, that is, when the angular velocity is in a first velocity range (a range of $-P$ to $P$) including the angular velocity of 0, the playback speed information according to the detected angular velocity is calculated through a first functional computation. When the angular velocity is in a second velocity range (an angular velocity exceeding P or an angular velocity exceeding $-P$ in rotations in an inverse direction), which is a range higher than the first velocity range, playback speed information according to the detected angular velocity is calculated through a second functional computation.

FIG. 8A is an enlarged view showing the relation of FIG. 7A.

In FIG. 8A, the first velocity range (the range of $-P$ to P) is enclosed by a broken line and defined as a region (1). The outside of the broken line is defined as a region (2).

In a case where the angular velocity is in a range of $-P$ to P, let y be the playback speed and x be the angular velocity, then the playback speed information y according to the angle is generated through a linear functional computation: $y=ax$, where a is a coefficient assumed such that $a=1$.

In a case where the angular velocity exceeds P (or $-P$), the playback speed information y according to the angular velocity is generated through a cubic functional computation: $y=bx^3$, where b is a coefficient, for example, such that $b=a$.

In short, it is set in such a manner that the relation between the angular velocity and the playback speed information in the region (1) is linear and the relation between the angular velocity and the playback speed information in the range (2) is non-linear.

This means that the user is able to reach the target frame easily by rotating the jog dial 11 relatively slowly when he conducts a search for the target in the neighborhood region in FIG. 5 whereas the user is able to reach the target position promptly by rotating the jog dial 11 faster when he conducts a search to the boundary region at a distant.

More specifically, the user becomes able to reach the target frame efficiently by increasing a rate of increase of the playback speed value according to a rotation speed of the jog dial 11 for a search to the boundary region at a distant while maintaining the search operability in the neighborhood. In other words, it is possible to reduce an amount of rotational operations on the jog dial 11 necessary until the user reaches the boundary region.

Because the boundary region can be handled in a satisfactory manner in the jog mode as described above, the search operability can be enhanced markedly, which makes contribution, for example, to more efficient and shorter editing works using the editing system.

Figure 9:
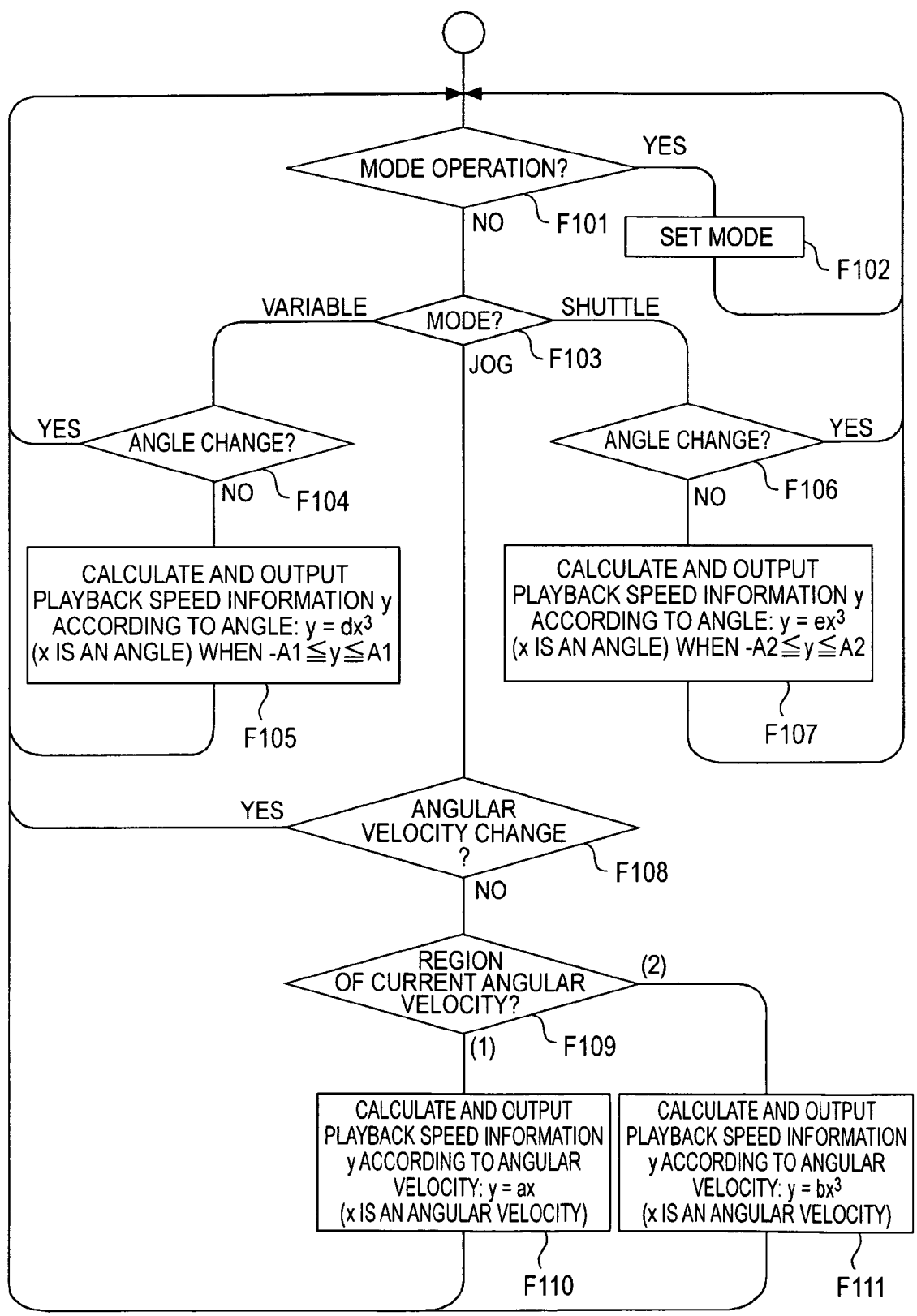
FIG. 9 is a flowchart depicting the processing relating to a jog dial operation in the first embodiment.

FIG. 9 shows an example of processing by the CPU 43 in the operation unit 1 to achieve the actions of this embodiment described with reference to FIG. 7A through FIG. 7C and FIG. 8A. FIG. 9 shows the processing by the CPU 43 involved with the operations on the jog dial 11 alone.

As has been described with reference to FIG. 3, the CPU 43 acquires the pulse PL and the angle information AG in association with rotations of the jog dial 11 from the rotation operation portion 41. It also detects operations on the shuttle mode key 12, the jog mode key 13, and the variable mode key 14.

In Step F101, the CPU 43 monitors operations on the shuttle mode key 12, the jog mode key 13, and the variable mode key 14. Upon detection of operations on any key, the CPU 43 proceeds to Step F102 and performs the mode setting. For example, upon detection of operations on the jog mode key 13, the CPU 43 sets the internal processing mode for the jog dial 11 to the jog mode. In Step F102, the CPU 43 performs the luminous control on the luminous portion 15 on the key to indicate the mode to the user in addition to the mode setting. When the jog mode is set, it performs the luminous control on the luminous portion 15 of the jog mode key 13.

In Step F103, the CPU 43 branches to appropriate processing according to the current mode.

In a case where the variable mode is currently set, the CPU 43 proceeds to Step F104. In Step F104, the CPU 43 determines whether an angle change has occurred on the basis of the angle information AG from the rotation operation portion 41. In a case where an angle change has occurred from the last angle, the CPU 43 proceeds to Step F105 to calculate the playback speed information y according to the current angle. In this case, as has been described with reference to FIG. 7B, the CPU 43 generates the playback speed information y according to the detected angle through a cubic functional computation, $y=dx^3$, where x is an angle, by setting the upper limit to the playback speed $Vm1$ (or $-Vm1$).

The CPU 43 then controls the external interface 46 to transmit the playback speed information y to the editing device 2 as an operation command. Consequently, a search action according to the playback speed information y is performed at the editing device 2 end.

In a case where the shuttle mode is currently set, the processing of the CPU 43 proceeds to Step F106 from Step F103. In Step F106, the CPU 43 determines whether an angle change has occurred on the basis of the angle information AG from the rotation operation portion 41. In a case where an angle change has occurred from the last angle, the CPU 43 proceeds to Step F107 and calculates the playback speed information y according to the current angle. In this case, as has been described with reference to FIG. 7C, the CPU 43 generates the playback speed information y according to the detected angle through a cubic functional computation, $y=ex^3$, where x is an angle, by setting the upper limit to the playback speed $Vm2$ (or $-Vm2$).

The CPU 43 then controls the external interface 46 to transmit the playback speed information y to the editing device 2 as an operation command. Consequently, a search action according to the playback speed information y is performed at the editing device 2 end.

In a case where the jog mode is currently set, the processing of the CPU 43 proceeds to Step F108 from Step F103. In Step F108, the CPU 43 confirms whether there is a change in a count value of pulses PL per unit time from the rotation operation portion 41, that is, in the angular velocity measured in the pulse counter 44.

In a case where an angular velocity change has occurred from the last angular velocity, the CPU 43 proceeds to Step F109, in which whether the current angular velocity falls within a range of the range (1) or the range (2) shown in FIG. 8A is confirmed.

In the case of the region (1), that is, in a case where the angular velocity falls within the range of −P to P, the CPU 43 proceeds to Step F110 and generates the playback speed information y according to the detected angular velocity through a linear functional computation, y=ax, where x is an angular velocity.

The CPU 43 then controls the external interface 46 to transmit the playback speed information y to the editing device 2 as an operation command. Consequently, a search action according to the playback speed information y is performed at the editing device 2 end.

Meanwhile, in the case of the region (2), that is, in a case where the angular velocity falls out of the range of −P to P, the CPU 43 proceeds to Step F111 and generates playback speed information y according to the detected angular velocity through a cubic functional computation, y=bx$^3$, where x is an angular velocity.

The CPU 43 then controls the external interface 46 to transmit the playback speed information y to the editing device 2 as an operation command. Consequently, a search action according to the playback speed information y is performed at the editing device 2 end.

Owing to the processing as above that is performed continuously in the CPU 43 in association with rotation operations on the jog dial 11, as has been described, not only is it possible to conduct a search operation in the appropriate mode according to the search distance to the target of search, but it is also possible to provide the operability suitable for a search in both the neighborhood region and the boundary region at a distant especially in the case of the jog mode.

Second Embodiment

An example as a second embodiment will be described with reference to FIG. 8B and FIG. 10.

This example is a modification of the calculation method of the playback speed information by the CPU 43 in the jog mode.

As with FIG. 8A described above, FIG. 8B shows a relation between the angular velocity and the playback speed in the jog mode.

The second embodiment is configured in such a manner that the playback speed information y is calculated by switching three functional computations according to the angular velocity in the jog mode.

More specifically, in a case where the angular velocity is in a first velocity range (a range of −P to P) including the angular velocity of 0, the playback speed information according to the detected angular velocity is calculated through a first functional computation.

In a case where the angular velocity is in a second velocity range (a range of −P to −Q and a range of P to Q), the playback speed information according to the detected angular velocity is calculated through a second functional computation.

In a case where the angular velocity is in a third velocity range (a range faster than −Q or Q), the playback speed information according to the detected angular velocity is calculated through a third functional computation.

In FIG. 8B, the first velocity range (a range of −P to P) is enclosed by a broken line and defined as a region (1). The second velocity range (a range of −P to −Q and a range of P to Q) is a range outside the broken line enclosed by an alternate long and short dash line and defined as a region (2). A region outside the alternate long and short dash line is defined as a region (3).

In a case where the angular velocity is in the range of −P to P, let y be the playback speed and x be the angular velocity, then the playback speed information y according to the angle is generated through a linear functional computation, y=ax.

In a case where the angular velocity is in the range of −P to −Q or in the range of P to Q, the playback speed information y according to the angular velocity is generated through a cubic functional computation, y=bx$^3$.

In a case where the angular velocity exceeds Q (or −Q), the playback speed information y according to the angular velocity is generated through a cubic functional computation, y=cx$^3$. Herein, the coefficient c>coefficient b.

More specifically, it is set in such a manner that the relation between the angular velocity and the playback speed information is linear in the region (1) whereas the relation between the angular velocity and the playback speed information is non-linear in the regions (2) and (3). In particular, in the case of the region (3), the rate of increase of a search speed with respect to the rotational operation speed on the jog dial 11 becomes higher than that in the region (2).

Even with the relations as above, as with the first embodiment above, it is possible to achieve better search operability in the jog mode, in particular, better operability for a search to the boundary region.

Figure 10:
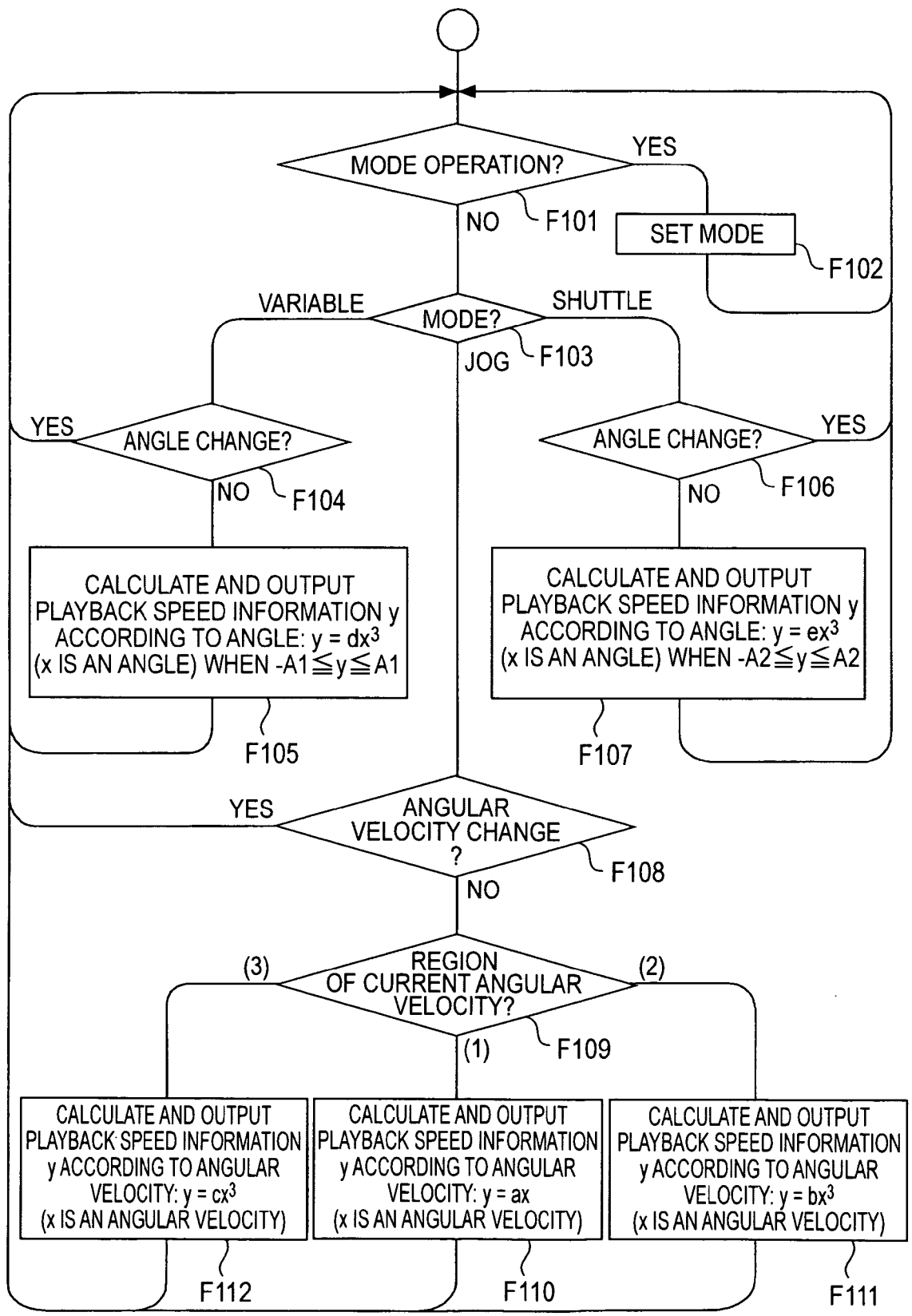
FIG. 10 is a flowchart depicting the processing relating to a jog dial operation in the second embodiment.

FIG. 10 shows an example of processing by the CPU 43. Because processing in Steps F101 through F108, F110, and F111 in FIG. 10 is the same as the processing in FIG. 9 described above, descriptions are not repeated herein.

According to the example of the processing in FIG. 10, in Step F109 in the jog mode, the CPU 43 determines in which of the regions (1), (2), and (3) the current angular velocity falls and then branches to the appropriate processing.

In the case of the region (1), the CPU 43 calculates the playback speed information y through a linear functional computation in Step F110, and in the case of the region (2), it calculates the playback speed information y through a non-linear functional computation, y=bx$^3$, where x is an angular velocity, in Step F111.

Further, in the case of the region (3), the CPU 43 proceeds to Step F112, and generates the playback speed information y according to the detected angular velocity through a cubic functional computation, y=cx$^3$, where x is an angular velocity.

The CPU 43 then controls the external interface 46 to transmit the playback speed information y to the editing device 2 as an operation command. Consequently, a search action according to the playback speed information y is performed at the editing device 2 end.

According to the processing as above, in the jog mode, the playback speed information y is calculated on the basis of the relation shown in FIGS. 8A and 8B and transmitted to the editing device 2.

In the first embodiment and the second embodiment, the upper limit of the playback speed is set in the variable mode and the shuttle mode whereas the upper limit of the playback speed is not determined in the jog mode. This is attributed to the fact that because the playback speed information y is calculated in response to a rate at which the user rotates the jog dial 11 (that is the angular velocity) in the jog mode, although there is a difference from one user to another user, the limit of the angular velocity of the rotational operation is naturally the limit of the playback speed to be calculated.

However, it goes without saying that the upper limit of the value may be set for the playback speed information y.

The first embodiment has described a case where two functional computations are switched according to the angular velocity in the jog mode and the second embodiment has described a case where three functional computations are switched according to the angular velocity. It goes without saying, however, that it may be modified in such a manner that switching takes place among four or more functional computations.

The settings of the respective functions and the setting of the angular velocity ranges to calculate the playback speed information y can be made in various manners and these can be customized for the user to make the device easier to use.

For example, it may be configured in such a manner that the user can arbitrary set the value P (value −P) and the value Q (value −Q) that set the angular velocity range in the jog mode. Also, it may be possible that user arbitrary set the coefficients a, b, and c of the functions (further, the coefficients d and e of the function in the variable mode and in the shuttle mode).

Third Embodiment

A third embodiment shows another example in terms of configuration and it is a case where the editing device and the operation portion are integrally formed as an editing device 2A.

Figure 11:
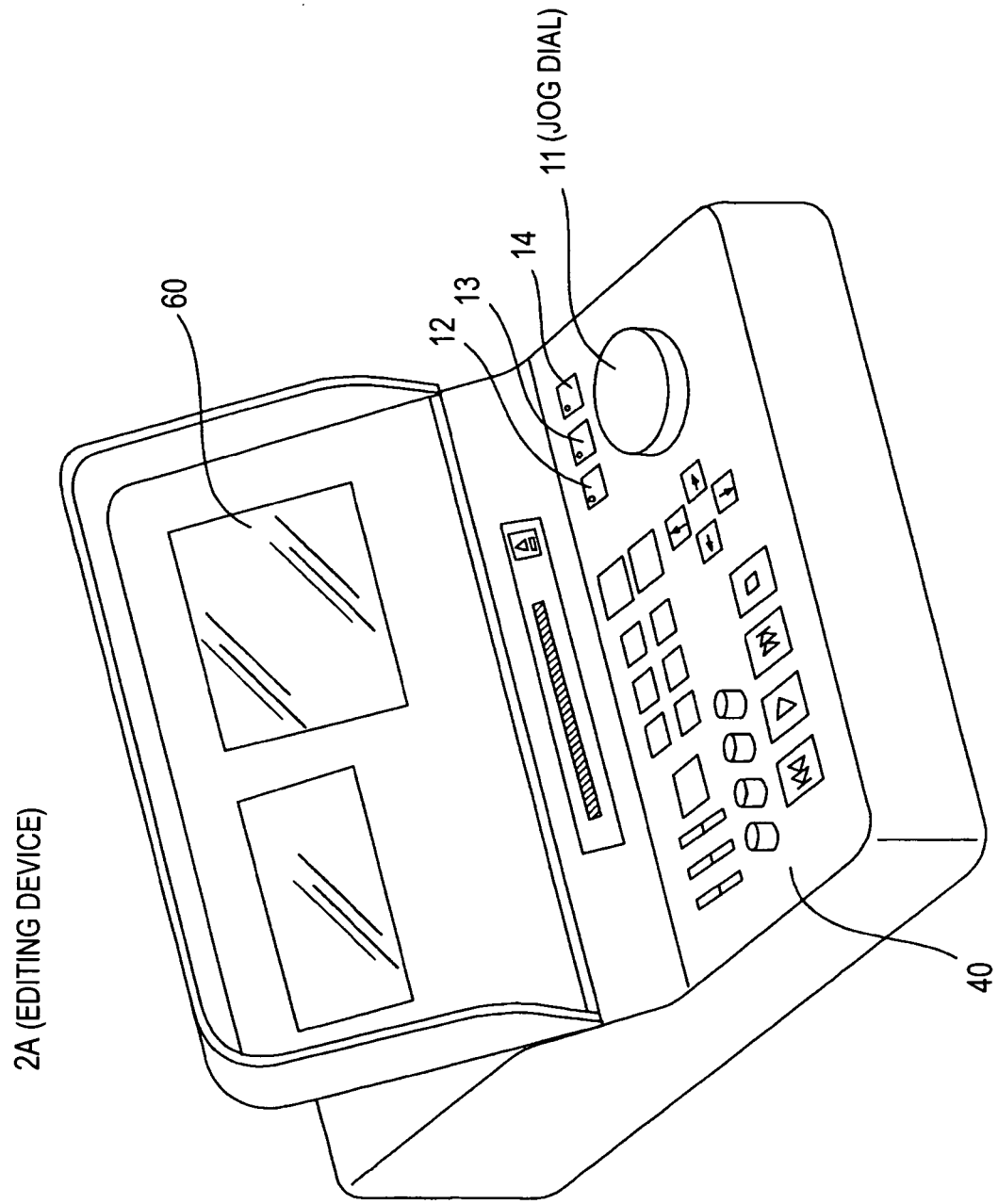
FIG. 11 is a view used to describe the outward appearance of an editing device of a third embodiment.

FIG. 11 shows an example of the outward appearance. As is shown in the drawing, the editing device 2A includes an operation panel portion 40 on the main body, on which are provided operation elements, such as the jog dial 11, the mode keys 12, 13, and 14, and other various operation keys and levers. Also, a display portion 60 is provided and a playback video is displayed thereon.

For example, this is a device suitable for use when production staff members of a broadcast program collect data in the field.

Figure 12:
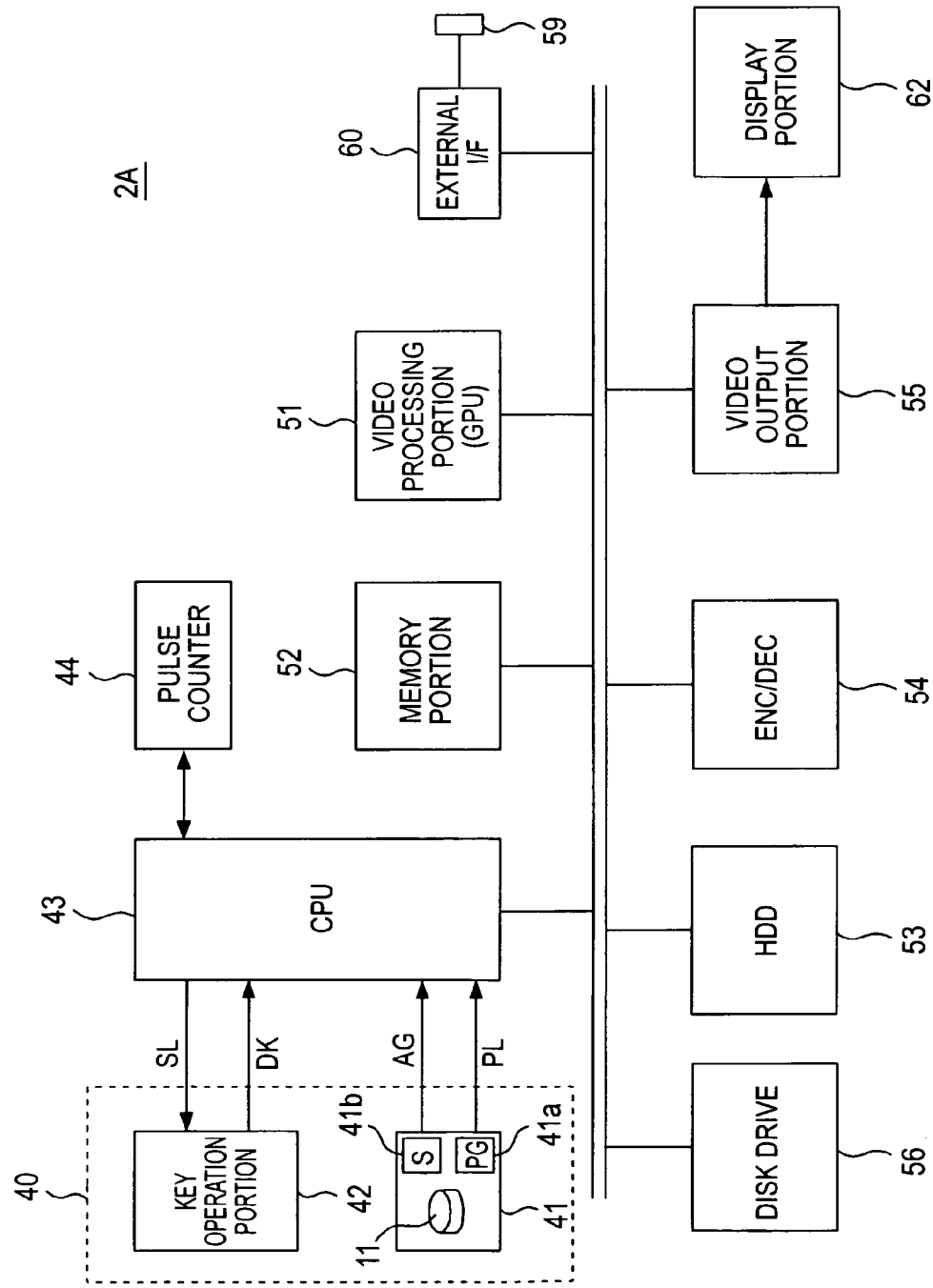
FIG. 12 is a block diagram of an editing device of the third embodiment.

FIG. 12 shows an example of the internal configuration of the editing device 2A.

As the operation panel portion 40, the CPU 43, and the pulse counter 44, configurations common with those of the operation unit 1 described above with reference to FIG. 3 are provided.

Also, as the video processing portion 51, the memory portion 52, the HDD 53, the encoder and decoder 54, the video output portion 55, the disk drive 56, the external interface 60, and the connection terminal 59, component portions common with those of the editing device 2 shown in FIG. 4 are provided.

Also, as the display portion 60, display panels, such as a liquid crystal panel and an organic EL panel, and a display drive control system of these panels are provided.

Because the actions and functions of the respective portions are the same as those described above with reference to FIG. 3 and FIG. 4, descriptions are omitted herein. However, in this case, the CPU 43 specifies the playback speed information y to the video processing portion 51 by performing the processing depicted in FIG. 9 or FIG. 10 in response to operations on the rotational operation portion 41. The video processing portion 51 then performs processing for a search playback action at the specified playback speed. A search video signal processed in the video processing portion 51 is supplied from the video output portion 55 to the display portion 62 and outputted to be displayed thereon.

As has been described, even with the editing device 2A having the operation panel portion 40 as an integral part thereof, the same advantages as those described in the first and second embodiments above can be achieved, too.

While the system and the device that perform video editing have been described by way of the embodiments of the invention, it should be appreciated that the operation processing method of the rotational operation element according to embodiments of the present invention is not particularly limited to a use in the editing device and it is also applicable to a broad range of devices of other types. For example, the operation processing method is also applicable to the operation processing on a jog dial provided to devices, such as a video player and a video camera.

It should be understood by those skilled in the art that various modifications, combinations, sub-combinations and alterations may occur depending on design requirements and other factors insofar as they are within the scope of the appended claims or the equivalents thereof.

What is claimed is:

1. An operation device comprising:
   a rotational operation element;
   an angular velocity detection portion detecting an angular velocity of a rotational operation on the rotational operation element; and
   a playback speed information computation portion calculating, when the angular velocity detected by the angular velocity detection portion is in a first velocity range including an angular velocity of 0, playback speed information according to the detected angular velocity through a first functional computation and when the angular velocity detected by the angular velocity detection portion is in a second velocity range, which is a range higher than the first velocity range, playback speed information according to the detected angular velocity through a second functional computation, and outputting the calculated playback speed information,
   wherein in the first functional computation a relation between the angular velocity and the playback speed information is linear and in the second functional computation a relation between the angular velocity and the playback speed information is non-linear, such that the calculated playback speed information obtained from an increase in the angular velocity in the second velocity range has a value of a playback speed associated therewith which is larger than that obtained with the same increase in the angular velocity in the first velocity range.

2. The operation device according to claim 1 further comprising:
   an angle detection portion detecting an angle of the rotational operation on the rotational operation element;
   wherein the playback speed information computation portion
   is able to calculate the playback speed information in an angular velocity mode and in an angle mode,
   calculates and outputs, in the angle mode, the playback speed information according to the angle detected by the angle detection portion, and calculates and outputs, in the angular velocity mode, the playback speed information according to the detected angular velocity.

3. The operation device according to claim 2, wherein the playback speed information specifies the playback speed of a video playback action.

4. The operation device according to claim 3, further comprising:
an external interface portion;
wherein the playback speed information calculated in the playback speed information computation portion is supplied to an external video playback device via the external interface portion.

5. A video playback device comprising:
a rotational operation element;
an angular velocity detection portion detecting an angular velocity of a rotational operation on the rotational operation element;
a video playback processing portion performing playback processing on video data; and
a playback speed information computation portion calculating, when the angular velocity detected by the angular velocity detection portion is in a first velocity range including an angular velocity of 0, playback speed information according to the detected angular velocity through a first functional computation and when the angular velocity detected by the angular velocity detection portion is in a second velocity range, which is a range higher than the first velocity range, playback speed information according to the detected angular velocity through a second functional computation, and outputting the calculated playback speed information as specifying information of a playback speed to the video playback processing portion,
wherein in the first functional computation a relation between the angular velocity and the playback speed information is linear and in the second functional computation a relation between the angular velocity and the playback speed information is non-linear, such that the calculated playback speed information obtained from an increase in the angular velocity in the second velocity range has a value of the playback speed associated therewith which is larger than that obtained with the same increase in the angular velocity in the first velocity range.

6. An operation information output method comprising the steps of:
detecting by use of an angular velocity detection device an angular velocity of a rotational operation on a rotational operation element;
calculating and outputting, when the angular velocity detected in the angular velocity detecting step is in a first velocity range including an angular velocity of 0, playback speed information according to the detected angular velocity through a first functional computation; and
calculating and outputting, when the angular velocity detected in the angular velocity detecting step is in a second velocity range, which is a range higher than the first velocity range, playback speed information according to the detected angular velocity through a second functional computation,
wherein the calculating steps are performed by a processor, and
wherein in the first functional computation a relation between the angular velocity and the playback speed information is linear and in the second functional computation a relation between the angular velocity and the playback speed information is non-linear, such that the calculated playback speed information obtained from an increase in the angular velocity in the second velocity range has a value of a playback speed associated therewith which is larger than that obtained with the same increase in the angular velocity in the first velocity range.

* * * * *